(12) United States Patent
Nanri

(10) Patent No.: US 6,871,130 B2
(45) Date of Patent: Mar. 22, 2005

(54) METHOD OF CONTROLLING AN AUTOMATIC TRANSMISSION

(75) Inventor: Takehiko Nanri, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/668,613

(22) Filed: Sep. 23, 2003

(65) Prior Publication Data
US 2004/0098183 A1 May 20, 2004

(30) Foreign Application Priority Data
Sep. 30, 2002 (JP) ........................................ 2002-284893

(51) Int. Cl.[7] ................................................ G06G 7/70
(52) U.S. Cl. .............................. 701/51; 701/53; 701/55; 477/34
(58) Field of Search ............................... 701/51, 53, 55, 701/56, 82, 90; 180/197; 477/34, 78, 99

(56) References Cited

U.S. PATENT DOCUMENTS 5,544,053 A * 8/1996 Nakashima .................. 701/57
5,839,083 A * 11/1998 Sugiyama .................... 701/62
6,015,020 A * 1/2000 Sugiyama ................... 180/197
6,070,118 A * 5/2000 Ohta et al. ................... 701/65

* cited by examiner

Primary Examiner—Richard M. Camby
(74) Attorney, Agent, or Firm—Carrier, Blackman & Associates, P.C.; Joseph P. Carrier; William D. Blackman

(57) ABSTRACT

A downshift control method for an automatic transmission, which transmission is normally downshifted, to increase a gear ratio, when a vehicle throttle is opened more than a preset value. The method includes a step of selecting a slip-determining threshold on the basis of an instantaneous steering angle of a vehicle. The method also includes steps of detecting a perceived rear wheel speed $V_s$, and averaging a number of rear wheel speeds $V_s$ to derive an average vehicle speed $V_a$. The normal downshift procedure is overridden, and the automatic transmission is prevented from downshifting, if a difference between the perceived rear wheel speed and the average vehicle speed exceeds the slip-determining threshold T, and the rear wheels are determined to be slipping.

10 Claims, 3 Drawing Sheets

METHOD OF CONTROLLING AN AUTOMATIC TRANSMISSION

CROSS-REFERENCE TO RELATED APPLICATIONS

The present application claims priority under 35 U.S.C. 119, based on Japanese patent application No. 2002-284893, filed Sep. 30, 2002.

BACKGROUND OF THE INVENTION

1. Field of the Invention

The present invention relates to a method of controlling an automatic transmission for a vehicle. More particularly, the method relates to a method of calculating whether the rear wheels of the vehicle are slipping during a cornering maneuver, and prohibiting downshifting of the automatic transmission in a case where the rear wheels have been determined to be slipping.

2. Description of the Background Art

Generally speaking, an automatic transmission automatically changes its gear ratio in accordance with an operating state of a vehicle. As a throttle is opened, by depressing an accelerator pedal quickly or past a certain critical point, the automatic transmission downshifts in order to increase the gear ratio, and to rapidly accelerate the vehicle (downshift control or kick-down).

One example of a method of controlling a gear change ratio to a lower limit during cornering is disclosed in Japanese Patent Laid-Open Publication Hei 8-210456.

With an vehicle, an accelerator is often depressed during cornering, in order to enable rear wheels to slide and to expedite cornering, which means that an automatic transmission is downshifted.

When the accelerator is pressed down extensively while the rear wheels are slipping, the automatic transmission undergoes a large gear ratio change, which will lead to an abrupt change in slip ratio of the rear wheels while the vehicle is cornering, adversely affecting ride quality.

SUMMARY OF THE INVENTION

The present invention is contemplated in consideration of the foregoing problems of the prior art, and is intended to provide a method of controlling an automatic transmission in order to enable a vehicle to corner smoothly, even if an accelerator is depressed.

In order to achieve the aforementioned object, according to one illustrative embodiment thereof, the present invention provides a method of controlling an automatic transmission which is downshifted to increase a gear change ratio, when a vehicle throttle is opened more than a preset value. The method includes a step of selecting a slip-determining threshold based on an instantaneous steering angle of a vehicle.

The method also includes steps of detecting a perceived rear wheel speed, and averaging a plurality of rear wheel speeds to derive an average vehicle speed. Finally, the method includes a step of prohibiting downshifting of the automatic transmission if a difference between the perceived rear wheel speed and the average vehicle speed exceeds the selected slip-determining threshold.

If a difference between the perceived rear wheel speed and the average vehicle speed exceeds a selected slip-determining threshold, the rear wheels are determined to be slipping. In such a state, even if the accelerator is depressed, the automatic transmission is prohibited from downshifting. This enables a driver to smoothly and comfortably turn the vehicle with the rear wheels slipping, even while slipping without normal downshifting procedures being carried out.

According to a particular embodiment of the present invention, the relationship of potential slip-determining thresholds to relative steering angles, with respect to the forward direction of the vehicle, is stored in electronic memory. In this embodiment, the relation between detected steering angle of the vehicle, and the range of possible slip-determining thresholds with respect to the relative steering angle stored in memory are used to determine a selected slip-determining threshold.

It is assumed here that there is a difference between the perceived wheel speed and the vehicle speed. When the steering angle is small, the slip-determining threshold is set to be large, so that the rear wheels are not easily determined to be slipping, and the automatic transmission may be downshifted.

In contrast, when the steering angle is large, the slip-determining threshold should be set to be small, so that the rear wheels are easily determined to be slipping, and the automatic transmission is likely to be prohibited from downshifting.

Regarding the relationship of the slip-determining threshold to the relative steering angle, with respect to the forward direction of the vehicle, the slip-determining threshold is set to be smaller, in conformity with the ride quality, as the relative steering angle is increased. The relationship between the slip-determining threshold and the relative steering angle is stored in electronic memory. A suitable slip-determining threshold for the currently detected steering angle is quickly selected, in order to determine a slipping state.

According to another embodiment of the present invention, with the present method of controlling an automatic transmission, the average vehicle speed is derived by averaging a plurality of periodically and recently detected wheel speeds.

By averaging a plurality of periodic and recent data, the derived average vehicle speed is likely to be free from abnormal data, such as noise in the wheel speed signals, and is likely to be substantially similar to the actual vehicle speed.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

An exemplary embodiment of the present invention will be described herein, with reference to FIGS. 1 through 5.

The vehicle to which the system of controlling an automatic transmission of this embodiment is applied may be, for example, an all-terrain vehicle or an off-road vehicle. The above reference to specific vehicle types is intended to illustrate, rather than to limit possible applications of the control system hereof.

A hydraulic static continuously variable transmission is used as an example of an automatic transmission on which the control system hereof may be used.

Figure 1:
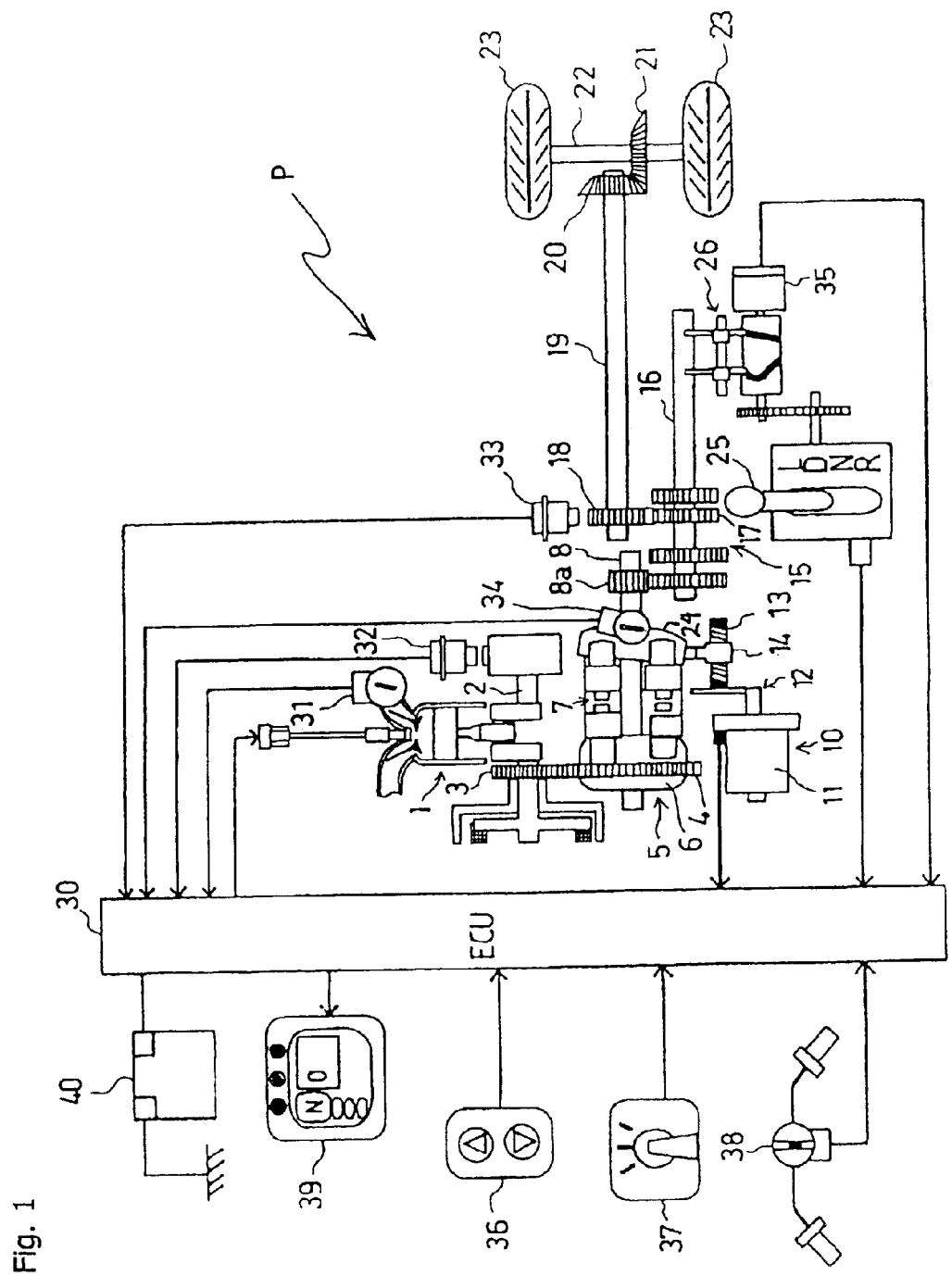
FIG. 1 is a schematic diagram of a control system according to a selected illustrative embodiment of the invention.

FIG. 1 schematically shows a control system for a vehicle powertrain P including an engine 1 and a transmission 5, according to a selected illustrative embodiment of the invention. The transmission 5 includes a fixed-displacement hydraulic pump 6 and a variable displacement hydraulic motor 7, which are integrated on a drive shaft 8, and are connected to each other by a closed hydraulic circuit (not shown).

The fixed-displacement hydraulic pump 6 is turned by a driven gear 4, which is engaged with a drive gear 3 on a crankshaft 2 of the internal combustion engine 1. Turning force of the fixed-displacement hydraulic pump 6 is converted and sent to the drive shaft 8. In this state, an angle of a movable oblique plate 24, housed in the variable displacement hydraulic motor 7, is changed by an angle changing mechanism 10, so that a gear ratio will be changed.

The angle changing mechanism 10 transmits an output of a control motor 11 to a reduction gear 12, which enables the angle of the oblique plate 24 of the variable displacement hydraulic motor 7 to be changed, via a ball screw 13 and a slider 14.

The output of the hydraulic static continuously variable transmission 5 is transmitted to secondary reduction gears 15 via an output gear 8a of the drive shaft 8. The output of the secondary reduction gears 15 is transmitted to a final output shaft 19, via an output gear 17 on a transmission output shaft 16, and also via a final output gear 18.

Rotation of the final output shaft 19 is transmitted to a rear axle 22 via bevel gears 20 and 21, and rotates rear wheels 23 to drive the vehicle.

The secondary reduction gears 15 are selectively used by manually operating a shift lever 25, in order to activate a shifter 26. The shift lever 25 is set to one of shift positions L or D (forward), R (reverse) or N (neutral). The transmission 5 allows stepless selection of the shift position L or D by controlling the angle θ of the movable oblique plate 24.

Specifically, an electronic control unit ECU 30 controls the actuation of the control motor 1, thereby changing the angle θ of the movable oblique plate 24.

The ECU 30 receives various signals from sensors, to help it determine the proper conditions for operating the engine 1 and transmission 5. Examples of signals sent to the ECU 30 include a throttle opening signal from a throttle sensor 31 provided in an air intake system of the internal combustion engine 1, an engine speed signal from a rotation sensor 32 provided near the crankshaft 2, a vehicle speed signal from a vehicle speed sensor 33 near the final output gear 18, a signal representing an angle of the movable oblique plate 24 from an angle sensor 34 provided on the oblique plate near the variable displacement hydraulic motor 7, and a shift position signal from a shift sensor 35 provided in the shifter 26.

Further, the ECU 30 receives signals not only from a shift switch 36 on a steering wheel but also from a mode map switch 37 and a signal from a steering angle sensor 38, for detecting a steering angle of the steering wheel.

An instrument panel 39 outputs various signals to indicators, and is powered by an in-vehicle battery 40.

In a control system such as the system described above, shift control of the hydraulic static continuously variable transmission 5 is performed by controlling the actuation of the control motor 11. When a rate of increase of the throttle opening, detected by the throttle sensor 31, exceeds a preset value while the vehicle is moving straight, the transmission 5 is downshifted in order to increase the change gear ratio (downshift control or kick-down).

The vehicle is specifically designed such that the accelerator may be depressed, to let the rear wheels slide, at the time of cornering. For this purpose, the hydraulic static continuously variable transmission 5 is specially controlled during cornering.

First of all, a check is performed to determine whether or not the rear wheels are slipping at the time of cornering. The average vehicle speed $V_a$ is derived by averaging perceived rear wheel speeds $V_s$, detected by the vehicle speed sensor 33.

A plurality of perceived wheel speeds $V_s$, are periodically and sequentially stored. It is checked whether or not the stored wheel speeds $V_s$ are within predetermined lower and upper limits. When all of the stored wheel speeds $V_s$ are within the limits, they are averaged to derive an average vehicle speed $V_a$. On the contrary, if any of the stored wheel speeds $V_s$ deviate from the limits, none of the stored wheel vehicle speeds are used. In such a case, the latest vehicle speed is used as the average vehicle speed $V_a$.

The average vehicle speed $V_a$ is derived by averaging a plurality of periodically detected (perceived) wheel speeds $V_s$, which are determined to be free from abnormal data such as noise in wheel speed detection signals, and can be considered to be substantially equal to an actual vehicle speed.

Figure 2:
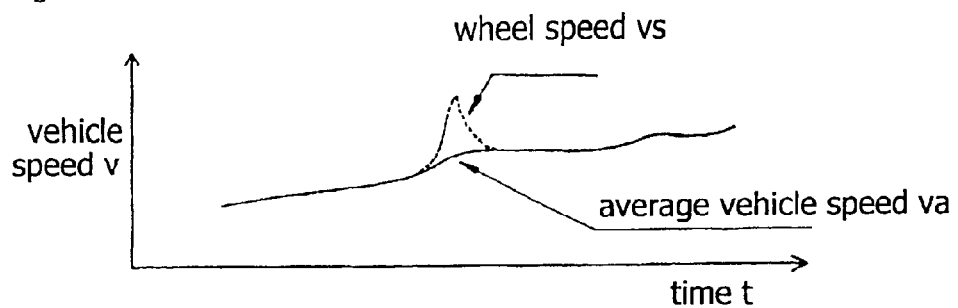
FIG. 2 is a graph showing variations of wheel speed $V_s$ and average vehicle speed $V_a$.

FIG. 2 shows variations of the perceived wheel speed $V_s$ (depicted by a dashed line) and the average vehicle speed $V_a$ (depicted by a solid line). As shown in FIG. 2, the vehicle speed V varies with time.

It will be noted that the graph of wheel speeds $V_s$ in FIG. 2 has a bump, shown in dashed lines in the Figure, which is caused by abnormal data such as noise in the detected signal. Such a bump is ignored in calculating the average vehicle speed $V_a$, and the graph is depicted instead by a smooth curve, as represented by the solid line in the drawing.

Usually, there is a slight difference ΔV between the perceived wheel speed $V_s$ and the average vehicle speed $V_a$. The difference $ΔV(ΔV(=V_s-V_a))$ becomes large when the rear wheels slip. The slip-determining threshold T is decided on the basis of the speed difference ΔV, and is used to determine whether or not the rear wheels are slipping during cornering.

It is assumed here that there is some significant difference ΔV between the perceived wheel speed $V_s$ and the average vehicle speed $V_a$. On one hand, as long as the steering angle is small, the slip-determining threshold T is set to be large, so that the transmission 5 can be easily downshifted. On the other hand, if the steering angle is large, the slip-determining threshold T should be set to be small, in order to immediately determine slipping of the rear wheels, where present, and to prohibit downshifting of the transmission 5.

Figure 3:
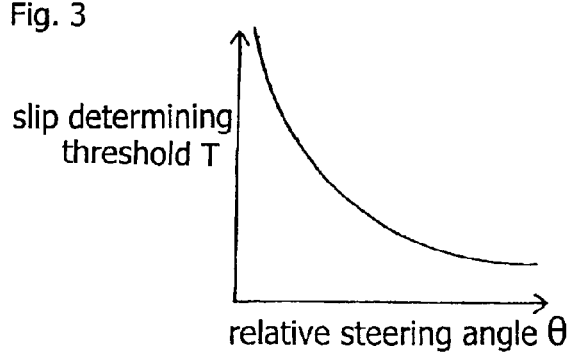
FIG. 3 is a graph showing the relationship between a relative steering angle θ and a slip-determining threshold T.

The relationship of the slip-determining threshold T to the relative steering angle θ, which is decided on the basis of steering angles detected by the steering angle sensor 38, with respect to the forward direction of the vehicle, is shown in FIG. 3. The larger the relative steering angle θ, the smaller the slip-determining threshold T is set, so as to be substantially in reverse proportion to the relative steering angle θ, in conformance with the ride quality.

The ECU 30 stores the relationship between the relative steering angle θ and the slip-determining threshold T, shown in FIG. 3.

It is checked whether or not the rear wheels are slipping, on the basis of the slip-determining threshold T, depending upon the relative steering angle θ.

Figure 4:
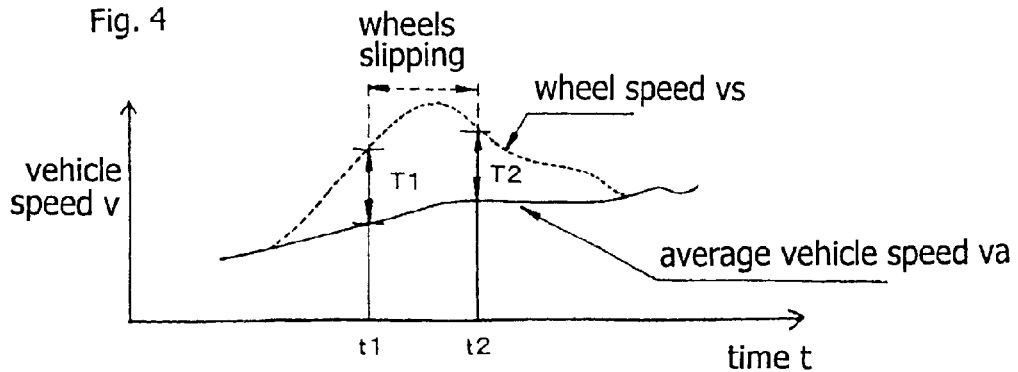
FIG. 4 is a graph showing variations of vehicle speeds applied to slip determination.

With reference to FIG. 4, it should be noted that there is a difference ΔV between the average vehicle speed $V_a$ and the instantaneous perceived wheel speed $V_s$. Up to a time point $t_1$, the difference ΔV is equal to or smaller than the slip-determining threshold T which depends upon the relative steering angle θ. At the time point $t_1$, the difference ΔV exceeds a slip-determining threshold $T_1$ and remains so until a time point $t_2$, i.e. ΔV≧T. At the time point $t_2$, the difference ΔV again becomes smaller than a slip-determining threshold $T_2$.

Therefore, the rear wheels are determined to be slipping from the time point $t_1$ until the time point $t_2$.

Figure 5:
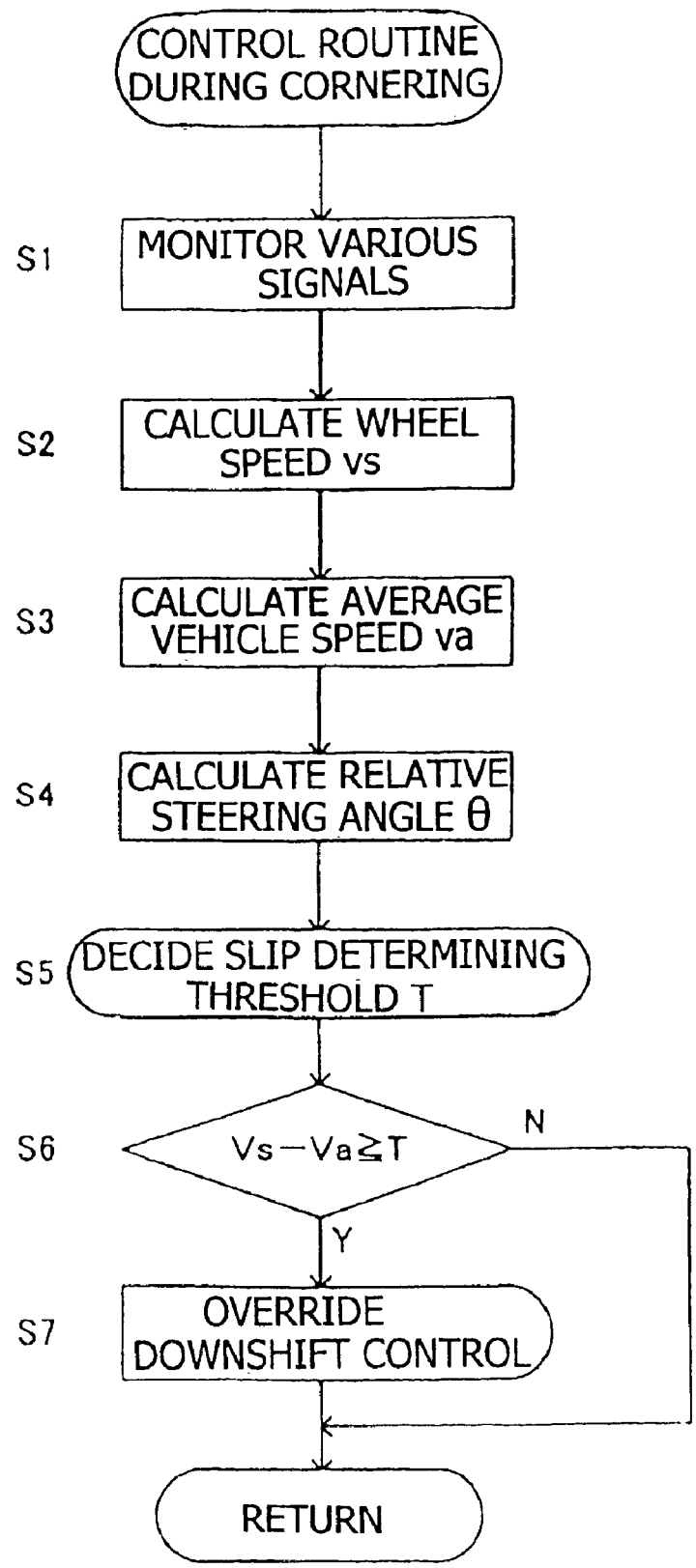
FIG. 5 is a flowchart of a control process for a static hydraulic continuous transmission at the time of cornering.

A control process of the hydraulic static continuously variable transmission 5 during cornering, based on the above-described method of slipping determination, is now described with reference to the flowchart of FIG. 5.

Various signals are monitored and recorded (step S1). The wheel speed $V_s$ is calculated on the basis of the signal from the vehicle speed sensor 33 (step S2). The average vehicle speed $V_a$ is calculated by averaging periodically obtained wheel speeds $V_s$ (step S3).

Thereafter, the relative steering angle θ is calculated on the basis of the detection signal from the steering angle sensor 38 (step S4). The slip-determining threshold T, corresponding to the calculated steering angle θ is then derived, based on the stored relationship between the relative steering angles θ and the slip-determining thresholds T (shown in FIG. 3) (step S5).

In the next step S6, it is checked whether or not the difference $V_s-V_a$ between the wheel speed $V_s$ and the average vehicle speed $V_a$ is equal to or more than the slip-determining threshold T which depends upon the relative steering angle θ at that time.

The process returns to step S1 if the difference $V_s-V_a$ is equal to or smaller than the slip-determining threshold T, and downshifting is allowed.

Conversely, if the difference $V_s-V_a$ is more than the slip-determining threshold T, the wheel is determined to be slipping, and the method proceeds to step S7, so that the downshift control is overridden, temporarily prohibiting downshifting of the transmission. The process then returns to step S1, and begins anew.

Therefore, the normal downshift control is overridden, and there is no variation in gear ratio, when the vehicle is turned while depressing the accelerator, in order to let the rear wheels slip during cornering. This enables the driver to smoothly and comfortably drive the vehicle around corners even though the rear wheels are slipping, thereby improving the ride quality.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A method of controlling an automatic transmission which is adapted to normally downshift to increase a gear ratio when a vehicle throttle is opened more than a preset amount, the method comprising the steps of:

a) selecting a slip-determining threshold based on an instantaneous steering angle of a vehicle;

b) detecting a perceived rear wheel speed of the vehicle;

c) averaging a number of recorded rear wheel speeds to derive an average vehicle speed; and d) prohibiting downshifting of the automatic transmission if a difference between the perceived rear wheel speed and the average vehicle speed exceeds the selected slip-determining threshold.

2. The method of claim 1, wherein the selected slip-determining threshold is based on a stored relationship between steering angles and potential slip-determining thresholds.

3. The method of claim 1, wherein the steering angle is decided on the basis of the forward direction of the vehicle.

4. The method of claim 1, wherein the average vehicle speed is derived by averaging a plurality of periodically and recently detected wheel speeds.

5. The method of claim 1, wherein the method is performed by an engine control unit for the vehicle.

6. A method of controlling a downshift function of an automatic transmission in a vehicle having a powertrain, comprising the steps of:

a) monitoring a plurality of signals from a plurality of sensors associated with the powertrain, said sensors comprising a vehicle speed sensor, a throttle position sensor and a steering angle sensor;

b) selecting a slip-determining threshold based on an instantaneous steering angle determined by said steering angle sensor;

c) detecting a perceived rear wheel speed;

d) averaging a plurality of rear wheel speeds and deriving an average vehicle speed; and e) overriding a normal downshift sequence and prohibiting downshifting of the automatic transmission if a difference between the perceived rear wheel speed and the average vehicle speed exceeds the selected slip-determining threshold.

7. The method of claim 6, wherein the selected slip-determining threshold is based on a stored relationship between steering angles and potential slip-determining thresholds.

8. The method of claim 6, wherein the steering angle is decided on the basis of the forward direction of the vehicle.

9. The method of claim 6, wherein the average vehicle speed is derived by averaging a plurality of periodically and recently detected wheel speeds.

10. The method of claim 6, wherein the method is performed by an engine control unit for the vehicle.

* * * * *

UNITED STATES PATENT AND TRADEMARK OFFICE
CERTIFICATE OF CORRECTION

PATENT NO. : 6,871,130 B2
DATED : March 22, 2005
INVENTOR(S) : Takehiko Nanri

It is certified that error appears in the above-identified patent and that said Letters Patent is hereby corrected as shown below:

Column 1,
Line 33, change "With an vehicle" to -- With a vehicle --.

Column 3,
Line 49, change "the control motor 1" to -- the control motor 11 --.

Column 4,
Line 22, change "wheel speeds $V_s$, are" to -- wheel speeds $V_s$ are --.
Line 49, change "($\Delta V$ (= $V_s$ - $V_a$))" to -- ($\Delta V = V_s - V_a$) --.

Column 6,
Line 7, change "Having thus, described" to -- Having thus described --.

Signed and Sealed this

Ninth Day of August, 2005

JON W. DUDAS
*Director of the United States Patent and Trademark Office*